(12) United States Patent
Sahi

(10) Patent No.: US 10,137,937 B1
(45) Date of Patent: Nov. 27, 2018

(54) ROOF ASSEMBLY FOR A VEHICLE

(71) Applicant: FORD GLOBAL TECHNOLOGIES, LLC, Dearborn, MI (US)

(72) Inventor: Jaspinder S. Sahi, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/653,141

(22) Filed: Jul. 18, 2017

(51) Int. Cl.
*B62D 25/06* (2006.01)
*B62D 27/06* (2006.01)

(52) U.S. Cl.
CPC ............. *B62D 25/06* (2013.01); *B62D 27/06* (2013.01)

(58) Field of Classification Search
CPC ................................ B62D 25/06; B62D 27/06
USPC .................................. 296/118, 210, 102, 104
See application file for complete search history.

(56) References Cited

U.S. PATENT DOCUMENTS

| | | | |
|---|---|---|---|
| 2,838,341 A | 3/1956 | Watson | |
| 4,823,707 A * | 4/1989 | Salsbury | B61D 39/00 105/377.02 |
| 5,393,117 A * | 2/1995 | Beale | B60J 7/104 296/100.18 |
| 7,025,402 B2 | 4/2006 | Remmel | |

FOREIGN PATENT DOCUMENTS

JP          402208146          * 8/1990

* cited by examiner

*Primary Examiner* — Joseph D. Pape
(74) *Attorney, Agent, or Firm* — Jason Rogers; Brooks Kushman P.C.

(57) ABSTRACT

A roof assembly for a vehicle has a roof panel and includes a bow having an upper surface for supporting the panel. The bow may define a hole extending in a lengthwise direction. The bow assembly may further include a cable extending through the hole that is adapted to be coupled to spaced-apart roof frame members. The cable is axially tensioned to support the bow and panel.

18 Claims, 4 Drawing Sheets

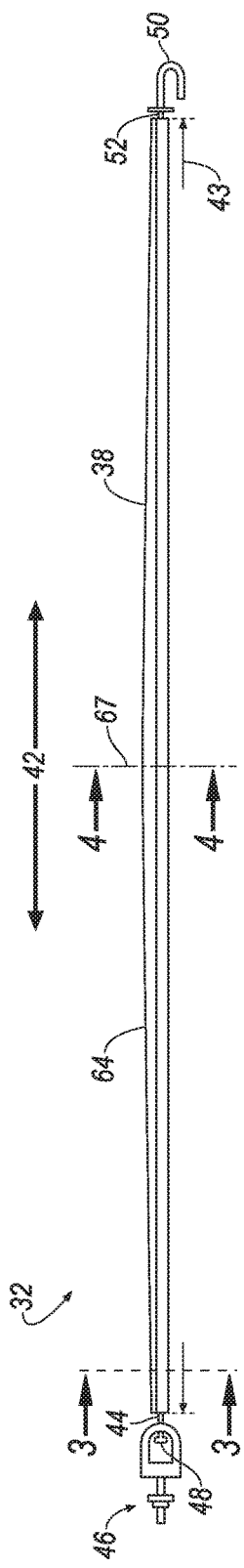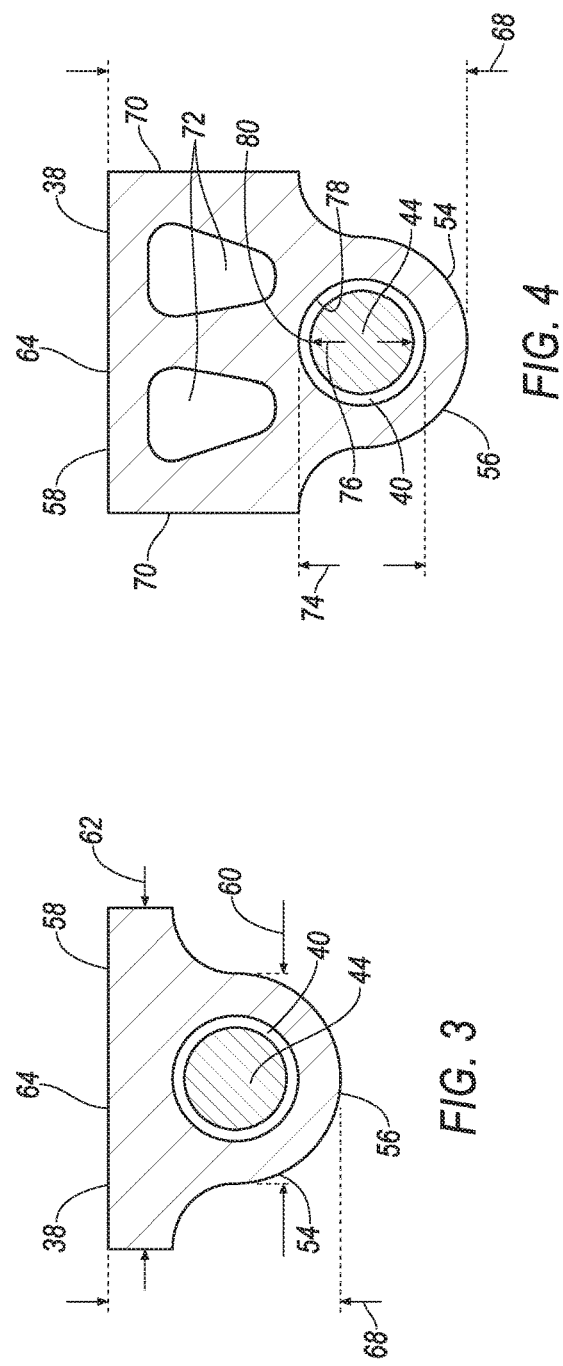

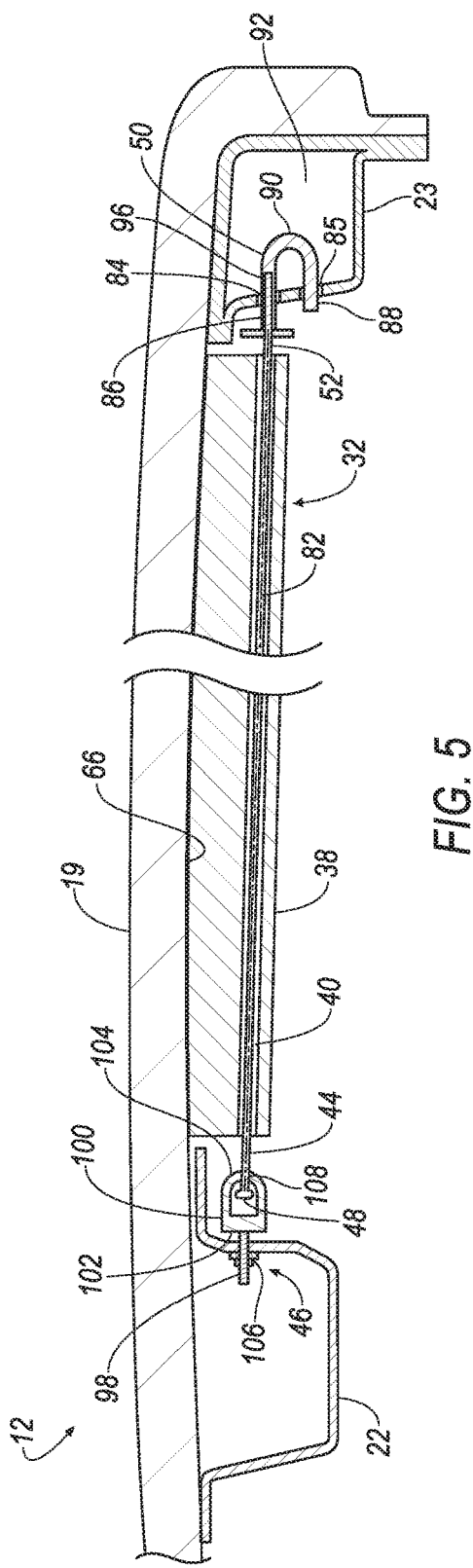
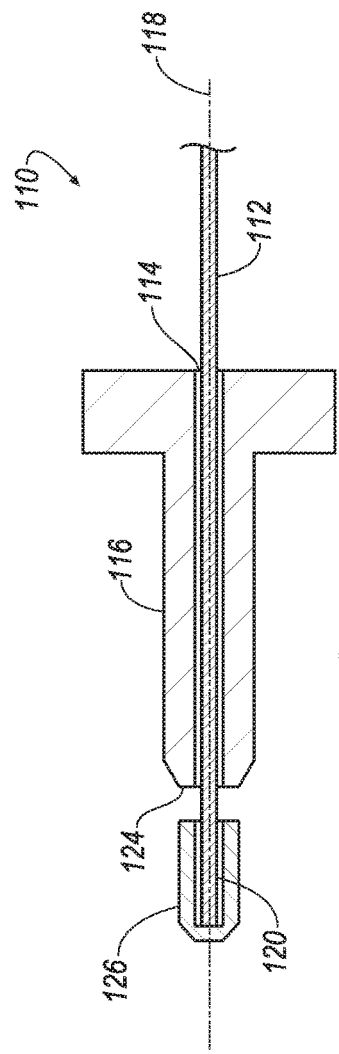

ROOF ASSEMBLY FOR A VEHICLE

TECHNICAL FIELD

This disclosure relates generally to vehicle structures, and more particularly to a roof assembly.

BACKGROUND

Roof bows may be attached to vehicle roof structures to strengthen the roof assembly and support the roof rails and roof panel. Roof support pillars may typically be located between the windows and doors of a vehicle.

SUMMARY

According to one aspect of this disclosure, a roof bow assembly is disclosed for a vehicle having a roof panel. The roof bow assembly includes a bow having an upper surface for supporting the panel. The bow may define a hole extending in a lengthwise direction. The roof bow assembly may further include a cable extending through the hole and adapted to be coupled to spaced-apart roof frame members. The cable may be configured to be axially tensioned to support the bow and panel.

The first and second ends of the cable may protrude outside of the bow to be attached to the spaced-apart roof frame members. The second end of the cable may be coupled to a turnbuckle assembly configured to be coupled to one of the spaced-apart roof frame members. The turnbuckle assembly may include a threaded connector and a loop coupled to the threaded connector at a first end of the loop and to the cable at a second end of the loop. The threaded connector may be configured to rotate relative to the loop to permit rotation of the threaded connector without rotation of the cable about a longitudinal axis of the cable.

The upper surface of the bow may be contoured to complement a lower surface of the roof panel. The upper surface may curve away from the cable in the lengthwise direction toward a center of the bow such that a depth of the bow is non-uniform in the lengthwise direction and reaches a maximum at the center.

According to another aspect of this disclosure, a roof assembly is disclosed for a vehicle that includes a panel having a contoured lower surface, first and second spaced-apart frame members supporting the panel, and a bow assembly coupled to and spanning between the frame members. The bow assembly may have a bow having a contoured upper surface contacting and supporting the lower surface of the panel, and a cable connected to the frame members and extending through a hole defined by the bow.

The bow assembly may further include a hook fixedly coupled to one end of the cable. The hook may extend through at least one aperture formed in the first spaced-apart frame member.

The hole defined by the bow may be greater than a diameter of the cable to allow for axial tensioning of the cable within the hole.

The first and second spaced-apart frame members may extend in a transverse direction. The bow may extend in a longitudinal direction perpendicular to the transverse direction.

According to another aspect of this disclosure, a method of reinforcing a vehicle roof is disclosed that includes inserting a cable through an opening defined by a bow, assembling the bow between first and second frame members, attaching the cable to the first and second frame members, and turning a threaded connector operatively connected between a first end of the cable and the first frame member to adjust a length of the cable relative to the bow for adjusting a tension applied to the cable.

The cable may be rotatably coupled to the threaded connector so rotation of the threaded connector does not rotate the cable about a longitudinal axis of the cable.

A second end of the cable opposite the first end may be fixedly coupled to the second frame member.

BRIEF DESCRIPTION OF THE DRAWINGS

FIG. 2 is a side elevational view of a roof bow assembly illustrated in FIG. 1.

FIG. 3 is a cross-sectional view taken along line 3-3 of FIG. 2.

FIG. 4 is a cross-sectional view taken along line 4-4 of FIG. 2.

FIG. 5 is a fragmentary cross-sectional view of the roof assembly of FIG. 1.

FIG. 6 is a cross-sectional fragmentary view of a roof bow assembly in accordance with another embodiment of the instant disclosure.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Various features illustrated and described with reference to the figures may be combined with features illustrated in one or more other figures to produce embodiments that are not explicitly illustrated or described. The combinations of features and modifications of the features consistent with the teachings of this disclosure could be applied to particular applications or implementations.

Figure 1:
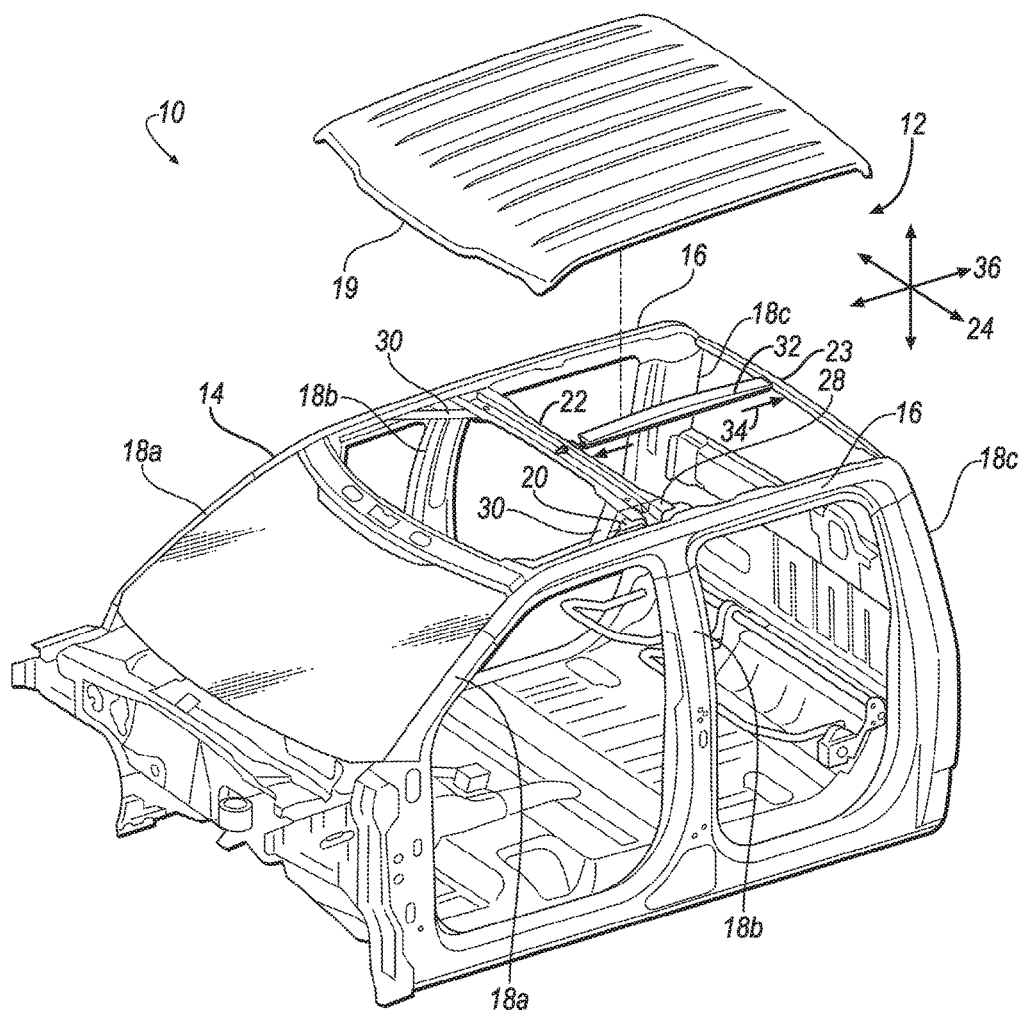
FIG. 1 is a fragmentary perspective view of a vehicle with a roof assembly.

Referring to FIG. 1, a vehicle 10 including a roof assembly 12 is illustrated. The vehicle has a body structure 14, which may be the body shell of the vehicle 10. The vehicle body structure 14 may be the skeletal structure to which various subsystems are attached. The vehicle body structure 14 may be a truck body structure; however, other body structures may be utilized. The vehicle body structure 14 may also be a shared vehicle platform suitable for various powertrains. The vehicle body structure 14 may be used for both internal combustion engine powertrains and alternate powertrains such as diesel or hybrid electric vehicles.

The vehicle body structure 14 may include roof rails 16 and support pillars 18 (e.g., A-Pillar 18a, B-Pillar 18b, and C-Pillar 18c) extending from the roof rails 16. A roof panel 19 may extend between and be supported by the roof rails 16.

The vehicle body structure 14 also includes the roof assembly 12. The roof assembly 12 may include handoff brackets 20 (or side brackets). The handoff bracket 20 may be secured to the roof rails 16 adjacent the pillars 18. The handoff bracket 20 may engage and be secured to an inward-facing wall of the roof rail 16. The handoff brackets 20 are formed of aluminum but, alternatively, may be formed of stamped high-strength steel, or another suitable material. The handoff brackets 20 may be fastened to the roof rails 16 using any suitable fastener, such as rivets (e.g., self-piercing rivets), nuts and bolts, or a combination thereof. In some embodiments, the handoff bracket 20 may be secured to other portions of the vehicle body structure 14, such as a pillar 18.

The roof assembly 12 may also include roof frame members 22 extending between the roof rails 16. In one embodiment, the roof frame members 22 may extend in a transverse direction 24 relative to a longitudinal axis 26 of the vehicle 10. The roof frame members 22 may be formed of extruded aluminum and may have 2 to 3 mm thick walls.

A roof spacer (or spacer bracket) 28 may connect the roof frame members 22 to a handoff bracket 20 to support the frame member 22 between the roof rails 16. The roof spacer 28 may be formed, for example, of aluminum. In other embodiments, the roof spacer 28 may be formed of stamped high-strength steel or other suitable material. The roof assembly 12 may include roof spacers 28 disposed at opposing ends of the frame members 22.

In one embodiment, the roof spacer 28 overlaps a portion of the handoff bracket 20. The roof frame member 22 may overlap a portion of the roof spacer 28. The roof spacer 28 may be integrally formed with the handoff bracket 20. In another embodiment, the roof spacer 28 may be secured directly to the roof rail 16 or other component of the vehicle body structure 14.

The roof frame members 22 may also be secured to the roof rails 16 by one or more braces 30, which may also be referred to as "K-braces." Each brace 30 may be secured at one end to a top side of the roof rail 16. The opposite end of the brace 30 is attached to a bottom side of flange portions of the roof frame member 22 to support the roof frame member 22.

The roof assembly 12 may also include a roof bow assembly 32 coupled to and spanning between the frame members 22. In one embodiment, a distance 34 between the frame members 22 may be 900 mm. The roof bow assembly 32 may be configured to support the panel 19 and stabilize the frame members 22. In the illustrated embodiment, the roof bow assembly 32 extends in a longitudinal direction 36 perpendicular to the transverse direction 24. In other embodiments, the roof bow assembly 32 may extend in a different direction, including the longitudinal direction 36. The roof bow assembly 32 may be spaced between the roof rails 16 with the roof bow assembly 32 being coupled to center portions of the frame members 22. Although the illustrated embodiment includes one roof bow assembly 32, there may be more than one roof bow assembly 32. For example and without limitation, there may be three roof bow assemblies 32 spaced between the roof rails 16 and coupled to the frame members 22 with each roof bow assembly 32 extending in the longitudinal direction 36. In another embodiment, the three roof bow assemblies 32 may extend in different directions.

FIG. 2 is a side elevational view of the roof bow assembly 32 illustrated in FIG. 1. FIG. 3 is a cross-sectional view taken along line 3-3 of FIG. 2. FIG. 4 is a cross-sectional view taken along line 4-4 of FIG. 2. The roof bow assembly 32 may include a bow 38 defining a hole or opening 40 extending in a lengthwise direction 42 (relative to a length 43 of the bow 38), a cable 44 extending through the hole 40, a turnbuckle assembly 46 coupled to an end 48 of the cable 44, and a hook 50 coupled to an end 52 of the cable 44 opposite the end 48.

As shown in FIGS. 3 and 4, the bow 38 may generally have a top-hat cross-section that varies in size along the length 43 (FIG. 2) of the bow 38. The bow 38 may have a lower portion 54 that extends the length 43 of the bow 38. The hole 40 defined by the bow 38 may extend through and be defined by the lower portion 54. An outer surface 56 of the lower portion 54 may be rounded. In other embodiments, the outer surface 56 may not be rounded. For example and without limitation, the lower portion 54 may have a square cross section. The lower portion 54 may curve outward toward an upper portion 58 of the bow disposed above the lower portion 54. Referring to FIG. 3, a width 60 of the lower portion 54 may be less than a width 62 of the upper portion 58.

As best shown in FIG. 2, the upper portion 58 of the bow 38 may have a contoured upper surface 64 for contacting and supporting a contoured lower surface 66 of the panel 19 (lower surface 66 of the panel 19 shown in FIG. 5). The upper surface 64 may be contoured to complement the lower surface 66 of the panel 19. As shown in FIG. 2, the upper surface 64 may curve away from the cable 44 in the lengthwise direction 42 toward a center 67 of the bow 38. A depth 68 of the bow 38, shown in FIGS. 4 and 3, is non-uniform in the lengthwise direction 42 and reaches a maximum at the center 67. The depth 68 may be measured between the upper surface 64 and the hole 40 along the length 43 of the bow 38.

Referring to FIG. 4, the upper portion 58 may also define side surfaces 70 that extend perpendicularly from the upper surface 64 to connect with the outer surface 56 of the lower portion 54. Although the upper portion 58 is illustrated as being generally wider than the lower portion 54, in other embodiments, the upper portion 58 may be narrower or the same width as the lower portion 54. In one embodiment, the upper portion 58 may define holes 72 extending therethrough in the lengthwise direction 42. Forming the holes 72 in the bow 38 decreases the weight of the bow 38. The holes 72 may be spaced equidistantly between the side surfaces 70 and between the upper surface 64 and hole 40 in the lower portion 54. The holes 72 may be generally triangular in shape with rounded corners with wider portions of the holes 72 near the upper surface 64.

With continued reference to FIGS. 3 and 4, the hole 40 in the lower portion 54 may be spaced equidistantly from the outer surface 56 of the lower portion along the length 43 (FIG. 2) of the bow 38. The hole 40 may be generally straight to complement the cable 44 extending through the hole 40. A diameter 74 of the hole 40 is greater than a diameter 76 of the cable 44 to allow for axial tensioning of the cable 44 within the hole 40. The diameter 76 of the cable 44 may be 5 to 15 mm in some embodiments. Although the cable 44 is illustrated as not contacting an inner surface 78 defining the hole 40, the cable 44 may contact the inner surface 78 when mounted to the vehicle 10. A roof load applied to the panel 19 (FIG. 1) may cause the bow 38 to deflect downward slightly and, in turn, cause the inner surface 78 to contact a top 80 of the cable 44. Some or all of the bow 38 may comprise a plastic material, for example, Acrylonitrile Butadiene Styrene (ABS).

With reference to FIG. 5, the cable 44 of the roof bow assembly 32 is a steel cable that is configured to be axially tensioned relative to a longitudinal axis 82 of the cable 44 to support the bow 38 and roof panel 19 (shown in FIG. 1). The cable 44 may extend through the hole 40 of the bow 38 and be adapted to be coupled to the spaced-apart roof frame members 22, 23 as shown in FIG. 5, which is a fragmentary cross-sectional view of the roof assembly 12 illustrating how the roof bow assembly 32 is coupled to the roof frame members 22, 23. The ends 48, 52 of the cable 44 may protrude outside of the bow 38 to be attached, connected, or coupled to the roof frame members 22, 23. The ends 48, 52 of the cable 44 may be disposed within the bow 38 and coupled to intermediary members that connect the cable 44 to the roof frame members 22, 23.

The end 52 of the cable 44 may be coupled to the hook 50 for insertion through at least one aperture 84, 85 formed in one of the roof frame members 22, 23. The end 52 may be fixedly coupled to the hook 50 that is configured to couple the cable 44 to the roof frame member 23. The hook 50 may extend through at least one aperture 84, 85 formed in the roof frame member 23. The roof frame member 23 defines two apertures formed through a side of the roof frame member 22 facing inward toward the cable 44. A base portion 86 of the hook 50 adjacent the end 52 of the cable 44 may be disposed within the aperture 84. A tip portion 88 of the hook 50 opposite the base portion 86 may be disposed within the aperture 85. The hook 50 may be shaped such that the base portion 86 is disposed along the longitudinal axis 82 of the cable 44 and the tip portion 88 is offset from the axis 82 by a radial distance. The hook 50 may also have an intermediate portion 90 between the base portion 86 and tip portion 88 that is generally semicircular in shape and is disposed within a cavity 92 defined by the roof frame member 23 and roof panel 19. The base portion 86 and tip portion 88 may be generally oriented parallel to one another. The end 52 of the cable 44 may be directly coupled to the frame member 23. The end 52 of the cable 44 may be inserted through an aperture 84 or 85 of the roof frame member 23 and crimped to prevent the end 52 of the cable 44 from being removed from the cavity 92.

The end 52 of the cable 44 may be welded to an inner surface of the hook 50 defining a bore 96 of the hook 50. It should be understood that there are multiple ways to couple the cable 44 to the hook 50.

The turnbuckle assembly 46 of the roof bow assembly 32 may be configured to be coupled to one of the spaced-apart roof frame members 22, 23. In the illustrated embodiment, the turnbuckle assembly 46 is coupled to the end 48 of the cable 44 to be attached to the spaced-apart roof frame member 22. The turnbuckle assembly 46 facilitates tensioning or translation of the end 48 of the cable 44 in the lengthwise direction 42 (relative to the end 52 of the cable 44) without rotation of the cable 44 about the longitudinal axis 82. There are a number of configurations other than the illustrated embodiment for tensioning of the cable 44 without rotation of the cable 44 about the axis 82.

The turnbuckle assembly 46 may include a threaded connector 98 and a loop 100 coupled to the threaded connector 98 at an end 102 of the loop 100 and to the cable 44 at an end 104 of the loop 100 opposite the end 102. The threaded connector 98 rotates relative to the loop 100 such that rotation of the threaded connector 98 within a threaded receptacle 106 coupled to or formed within the roof frame member 22 causes the end 48 of the cable 44 to translate axially away from the end 52 of the cable 44 without rotating the cable 44 about the longitudinal axis 82. The threaded connector 98 may be a bolt and the threaded receptacle 106 may be a nut. The loop 100 may define a hole 108 at the end 104 of the loop 100 for receiving the end 48 of the cable 44. The end 48 of the cable 44 may be crimped to retain the cable 44 within the hole 108. The loop 100 may be rotatably coupled to the threaded connector 98 to rotate relative to the loop 100. In another embodiment, the loop 100 may be coupled to the threaded connector 98 such that the loop 100 rotates with the threaded connector 98 (relative to the threaded receptacle 106). The end 48 of the cable 44 may be fixedly or rotatably coupled to the loop 100. In one embodiment, the end 48 of the cable 44 may be welded to the loop 100.

FIG. 6 is a cross-sectional fragmentary view of a roof bow assembly 110 in accordance with another embodiment of the instant disclosure. The roof bow assembly 110 of FIG. 6 may be used with the roof assembly 12 of FIG. 1 in place of the roof bow assembly 32 illustrated in FIGS. 2-4. In the illustrated embodiment of FIG. 6, a cable 112 of the roof bow assembly 110 may extend through a hole 114 defined by the threaded connector 116. The hole 114 may extend along a longitudinal axis 118 of the threaded connector 116. An end 120 of the cable 112 may be welded within a ferrule 126 to retain the cable 112 within the hole 114 of the threaded connector 116. Rotation of the threaded connector 116 relative to a threaded receptacle (such as the threaded receptacle 106 shown in FIG. 5) causes the threaded connector 116 to translate relative to an end of the cable opposite the end 120. Upon translation of the threaded connector 116, an end 124 of the threaded connector 116 may contact the ferrule 126 coupled to the end 120 of the cable 112 and push the ferrule 126 and end 120 of the cable 112 away from the opposite end of the cable 112 (not shown). Translation of the end 120 of the cable 112 adjusts the degree of tensioning in the cable 112. In one embodiment, the cable 112 may extend through a hole of a bow as shown and described in connection with the illustrated embodiment of FIGS. 1-5. In one embodiment, the cable 112 may be coupled to a hook at the end opposite the end 120, as shown and described in connection with the illustrated embodiment of FIGS. 1-5.

Figure 7:
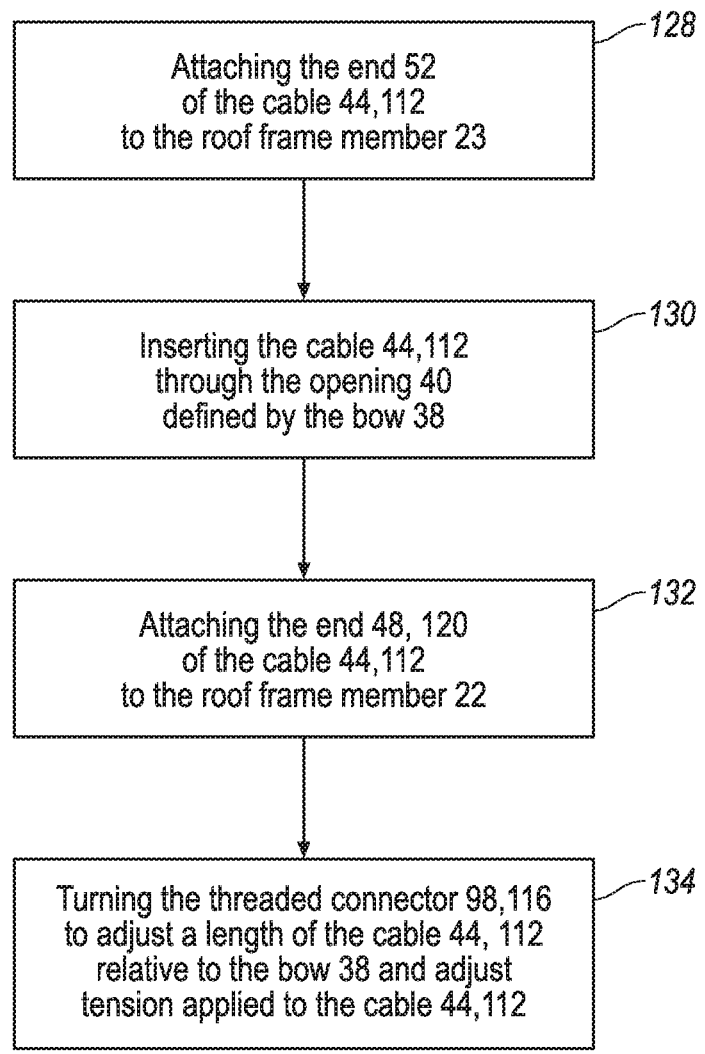
FIG. 7 is a flowchart illustrating a method of reinforcing a vehicle roof in accordance with an embodiment of the instant disclosure.

FIG. 7 is a flowchart illustrating one example of a method of reinforcing a vehicle roof. The method begins with the step 128 of attaching the end 52 of the cable 44, 112 to the roof frame member 23. As described above, the end 52 of the cable 44, 112 may be coupled to the hook 50. The cable 44, 112 may be welded or crimped to the hook 50. Alternatively, the cable 44, 112 may extend through a hole in the hook 50 with the ferrule at the end 52 of the cable 44, 112 to retain the cable 44, 112 within the hole. The hook 50 may then be coupled to the roof frame member 23. As illustrated in FIG. 5, the hook 50 may extend through at least one aperture 84, 85 formed in the roof frame member 23. It should be understood that there are a number of ways to attach the end 52 of the cable 44, 112 to the roof frame member 23. For example and without limitation, the cable 44, 112 may be inserted through an aperture 84, 85 formed in the roof frame member 23 and then crimped or swaged to retain the cable 44 within the aperture 84, 85.

The method continues with the step 130 of inserting the cable 44, 112 through the opening 40 defined by the bow 38.

The method continues with the step 132 of attaching the end 48, 120 of the cable 44, 112 to the roof frame member 22. Attaching the end 48, 120 of the cable 44, 112 to the roof frame member 22 includes the sub steps of coupling the end 48, 120 of the cable 44, 112 to the turnbuckle assembly 46 (shown in FIG. 5) or threaded connector 116 (shown in FIG. 6), and coupling the turnbuckle assembly 46 or threaded connector 116 to the roof frame member 22. The threaded connector 98, 116 may be inserted through an aperture formed in a side of the roof frame member 22 and into the threaded receptacle 106.

The method continues with the step 134 of turning the threaded connector 98, 116 operatively connected between the end 48, 120 of the cable 44, 112 and roof frame member 22 to adjust a length of the cable 44, 112 relative to the bow 38 and adjust tension applied to the cable 44, 112. The extent of elongation of the cable 44, 112 may be based on the desired strain in the cable 44, 112; the nominal steel strength grade of the cable 44, 112; and/or the diameter 76 of the cable 44, 112. In some embodiments, the change in the length of the cable 44, 112 may be from 5 to 15 mm, as a result of the tensioning and elongating.

While exemplary embodiments are described above, it is not intended that these embodiments describe all possible forms encompassed by the claims. The words used in the specification are words of description rather than limitation, and it is understood that various changes may be made to the disclosed embodiments. The features of the disclosed embodiments may be combined to form further embodiments of the disclosure that may not be explicitly described or illustrated. While various embodiments could have been described as providing advantages or being preferred, one or more features or characteristics may be compromised to achieve desired overall system attributes, depending on specific applications and implementations. These attributes may include, but are not limited to cost, strength, durability, life cycle cost, marketability, appearance, packaging, size, serviceability, weight, manufacturability, ease of assembly, etc. As such, embodiments described as less desirable than other embodiments with respect to one or more characteristics are not outside the scope of the disclosure and may be desirable for particular applications.

What is claimed is:

1. A roof bow assembly for a vehicle having a roof panel, comprising:
   a bow having an upper surface for supporting the panel, the bow defining a hole extending in a lengthwise direction; and
   a cable extending through the hole and adapted to be coupled to spaced-apart roof frame members, wherein first and second ends of the cable protrude outside of the bow to be attached to the spaced-apart roof frame members, wherein the second end of the cable is coupled to a turnbuckle assembly configured to be coupled to one of the spaced-apart roof frame members, and wherein the cable is configured to be axially tensioned to support the bow and panel.

2. The roof bow assembly of claim 1, wherein the first end of the cable is coupled to a hook for insertion through at least one aperture formed in one of the spaced-apart roof frame members.

3. The roof bow assembly of claim 1, wherein the turnbuckle assembly includes a threaded connector and a loop coupled to the threaded connector at a first end of the loop and to the cable at a second end of the loop, and wherein the threaded connector is configured to rotate relative to the loop to permit rotation of the threaded connector without rotation of the cable about a longitudinal axis of the cable.

4. The roof bow assembly of claim 1, wherein the cable is steel, and the bow is plastic.

5. A roof bow assembly for a vehicle having a roof panel, comprising:
   a bow having an upper surface for supporting the panel, the bow defining a hole extending in a lengthwise direction; and
   a cable extending through the hole and adapted to be coupled to spaced-apart roof frame members, wherein the cable is configured to be axially tensioned to support the bow and panel, wherein the upper surface of the bow is contoured to complement a lower surface of the roof panel.

6. The roof bow assembly of claim 5, wherein the upper surface curves away from the cable in the lengthwise direction toward a center of the bow such that a depth of the bow is non-uniform in the lengthwise direction and reaches a maximum at the center.

7. A roof assembly for a vehicle, comprising:
   a panel having a contoured lower surface;
   first and second spaced-apart frame members supporting the panel; and
   a bow assembly coupled to and spanning between the frame members, the bow assembly having a bow having a contoured upper surface contacting and supporting the lower surface of the panel, and a cable connected to the frame members and extending through a hole defined by the bow.

8. The roof assembly of claim 7, wherein the bow has a non-uniform depth measured between the contoured upper surface and hole along a length of the bow.

9. The roof assembly of claim 8, wherein the contoured upper surface curves away from the cable in a lengthwise direction toward a center of the bow such that the non-uniform depth of the bow reaches a maximum at the center.

10. The roof assembly of claim 7, wherein first and second ends of the cable protrude outside of the bow for coupling with the first and second spaced-apart frame members.

11. The roof assembly of claim 7, wherein the bow assembly further includes a hook fixedly coupled to one end of the cable, and wherein the hook extends through at least one aperture formed in the first spaced-apart frame member.

12. The roof assembly of claim 7, wherein the bow assembly further includes a turnbuckle assembly coupled to one end of the cable for attachment to the second spaced-apart frame member.

13. The roof assembly of claim 12, wherein the turnbuckle assembly includes a threaded connector and a loop coupled to the threaded connector at a first end of the loop and to the cable at a second end of the loop, and wherein the threaded connector is configured to rotate relative to the loop such that rotation of the threaded connector within a threaded receptacle coupled to the second spaced-apart frame member causes the end of the cable to translate axially without rotation of the cable about a longitudinal axis of the cable.

14. The roof assembly of claim 7, wherein the hole defined by the bow is greater than a diameter of the cable to allow for axial tensioning of the cable within the hole.

15. The roof assembly of claim 7, wherein the first and second spaced-apart frame members extend in a transverse direction, and wherein the bow extends in a longitudinal direction perpendicular to the transverse direction.

16. A method of reinforcing a vehicle roof, comprising:
   inserting a cable through an opening defined by a bow;
   assembling the bow between first and second frame members;
   attaching the cable to the first and second frame members; and
   turning a threaded connector operatively connected between a first end of the cable and the first frame member to adjust a length of the cable relative to the bow and adjust a tension applied to the cable.

17. The method of claim 16, wherein the cable is rotatably coupled to the threaded connector such that rotation of the threaded connector does not cause rotation of the cable about a longitudinal axis of the cable.

18. The method of claim 17, wherein a second end of the cable opposite the first end is fixedly coupled to the second frame member.

\* \* \* \* \*